United States Patent
Han (10) Patent No.: US 9,754,086 B1
(45) Date of Patent: Sep. 5, 2017

(54) SYSTEMS AND METHODS FOR CUSTOMIZING PRIVACY CONTROL SYSTEMS

(71) Applicant: Symantec Corporation, Mountain View, CA (US)

(72) Inventor: Zhao Han, Beijing (CN)

(73) Assignee: Symantec Corporation, Mountain View, CA (US)

(*) Notice: Subject to any disclaimer, the term of this patent is extended or adjusted under 35 U.S.C. 154(b) by 67 days.

(21) Appl. No.: 14/281,859

(22) Filed: May 19, 2014

(51) Int. Cl.
 *H04L 29/06* (2006.01)
 *G06F 21/10* (2013.01)
(52) U.S. Cl.
 CPC .................................. *G06F 21/10* (2013.01)
(58) Field of Classification Search
 CPC ......... H04L 41/00; H04L 63/00; G06F 17/30; G06F 21/00
 See application file for complete search history.

(56) References Cited

U.S. PATENT DOCUMENTS

| | | | |
|---|---|---|---|
| 6,567,928 B1* | 5/2003 | Lyle et al. | 714/15 |
| 6,748,538 B1* | 6/2004 | Chan et al. | 726/26 |
| 2011/0202999 A1* | 8/2011 | Logan | G06F 21/6227 726/26 |
| 2012/0303476 A1* | 11/2012 | Krzyzanowski | G06F 8/60 705/26.5 |

OTHER PUBLICATIONS

"Samsung for Enterprise", http://www.samsung.com/us/business/samsung-for-enterprise/index.html?cid=omc-mb-cph-1112-10000022, as accessed Mar. 24, 2014, (Jan. 12, 2013).

* cited by examiner

*Primary Examiner* — Joseph P Hirl
*Assistant Examiner* — Leynna Truvan
(74) *Attorney, Agent, or Firm* — FisherBroyles LLP (57) ABSTRACT

The disclosed computer-implemented method for customizing privacy control systems may include (1) identifying a data entry, from within a set of data entries stored on a computing device, that has been selected to be inaccessible by an application installed on the computing device, (2) marking the data with an indication that the data entry has been selected to be inaccessible by the application, (3) intercepting an attempt made by the application to access the data entry, (4) determining that the application is not permitted to access the data entry by identifying the indication that the data entry was selected to be inaccessible by the application, and (5) blocking the application from accessing the data entry in response to determining that the data entry has been marked as inaccessible while allowing at least one additional application to access the data entry. Various other methods, systems, and computer-readable media are also disclosed.

20 Claims, 7 Drawing Sheets

SYSTEMS AND METHODS FOR CUSTOMIZING PRIVACY CONTROL SYSTEMS

BACKGROUND

As the use of mobile technology grows, individuals may increasingly utilize their personal computing devices in workplace environments. For example, employees who take advantage of Bring Your Own Device (BYOD) policies may use private cell phones, PDAs, and/or laptops for both business-related and personal communications, data storage, etc.

As a result, many users may install work-related applications onto their personal devices. Some work-related applications (e.g., scheduling applications) may request permission to access certain types of information (e.g., contacts in a phonebook) on the user's device. Unfortunately, traditional privacy control systems may operate on an "all-or-nothing" basis. For example, if an application requests access to a user's phonebook, an operating system may either allow access to every contact or it may prevent access to every contact. As such, granting permission to access requests may allow applications to access both work-related and private content (e.g. pictures, contact information of family members, etc.) that users may not want made accessible in the workplace. Alternatively, granting access rights to an application that is primarily intended for personal use may also allow the application to access potentially sensitive work data (e.g., confidential information). Thus, conventional privacy control systems may not allow users to safely and privately operate various types of work and personal applications on a single computing device. As such, the current disclosure identifies and addresses a need for more efficient and effective systems and methods for customizing privacy control systems.

SUMMARY

As will be described in greater detail below, the instant disclosure describes various systems and methods for customizing privacy control systems by identifying individual data entries that have been selected to be inaccessible by a particular application. The data entries, once identified, may be blocked from being accessed by the application.

In one example, a computer-implemented method for customizing privacy control systems may include (1) identifying at least one data entry, from within a set of data entries stored on a computing device, that has been selected to be inaccessible by an application installed on the computing device, (2) marking the data with an indication that the data entry has been selected to be inaccessible by the application, (3) intercepting an attempt made by the application to access the data entry, (4) determining that the application is not permitted to access the data entry by identifying the indication that the data entry was selected to be inaccessible by the application, and (5) blocking the application from accessing the data entry in response to determining that the data entry has been marked as inaccessible while allowing at least one additional application to access the data entry. In some embodiments, the data entry may include contact information, an image, a calendar event, an email, and/or a text message.

In some examples, identifying the data entry may include determining that a user of the computing device selected the data entry to be inaccessible by the application. In other examples, identifying the data entry may include determining that a category of the data entry is a category known to include private data. Additionally or alternatively, identifying the data entry may include identifying the data entry on a list of data entries selected to be inaccessible. In these examples, the list may have originated from outside the computing device. In further examples, identifying the data entry may include determining that the data entry was not selected to be accessible by the application.

In some embodiments, marking the data entry with the indication may include a user entering the indication into a graphical user interface user input field associated with the data entry. In other embodiments, marking the data entry may include associating the data entry with the indication in a database. Additionally or alternatively, marking the data entry may include (1) accessing a server that stores a private key associated with a user of the computing device, (2) creating a hash of the data entry and sending the hash to the server, (3) receiving, from the server, the hash signed with the private key associated with the user, and (4) associating the data entry with the private key. In this case, identifying the indication that the data entry was selected to be inaccessible may include verifying the private key with a public key associated with the user.

In some examples, intercepting the attempt by the application to access the data entry may include hooking an application program interface associated with the data entry before the application attempts to access the data entry. In these examples, intercepting the attempt may then include intercepting, with the application program interface hook, a function call made by the application to access to the data entry.

In some embodiments, the method may further include determining that at least one additional data entry within the set of data entries was not selected to be inaccessible by the application. In such embodiments, the method may then include allowing the application to access the additional data entry.

In one embodiment, a system for implementing the above-described method may include (1) an identification module that identifies at least one data entry, from within a set of data entries stored on a computing device, that has been selected to be inaccessible by an application installed on the computing device, (2) a marking module that marks data with an indication that the data entry has been selected to be inaccessible by the application, (3) an interception module that intercepts an attempt made by the application to access the data entry, (4) a determination module that determines that the application is not permitted to access the data entry by identifying the indication that the data entry was selected to be inaccessible by the application, and (5) a blocking module that blocks the application from accessing the data entry in response to determining that the data entry has been marked as inaccessible while allowing at least one additional application to access the data entry. In addition, the system may include at least one processor configured to execute the identification module, the marking module, the interception module, the determination module, and the blocking module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify at least one data entry, from within a set of data entries stored on a computing device, that has been selected to be inaccessible by an application installed on the computing device, (2) mark the data with an indication that the data entry has been selected to be inaccessible by the application, (3) intercept an attempt made by the application to access the data entry, (4) determine that the application is not permitted to access the data entry by identifying the indication that the data entry was selected to be inaccessible by the application, and (5) block the application from accessing the data entry in response to determining that the data entry has been marked as inaccessible while allowing at least one additional application to access the data entry.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for customizing privacy control systems. As will be explained in greater detail below, by identifying individual data entries that have been selected to be inaccessible to a particular application, the disclosed systems and methods may prevent the application from accessing the data entries. In addition, by selectively blocking certain applications' access to individually selected data entries, the described systems and methods may provide users customizable, granular control over the access of particular applications to specific data entries. Furthermore, the disclosed systems and methods may enable users to operate both work-related and private applications on personal computing devices while adequately protecting both work and personal data.

The following will provide, with reference to FIGS. 1-2 and 4-5, detailed descriptions of exemplary systems for customizing privacy control systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
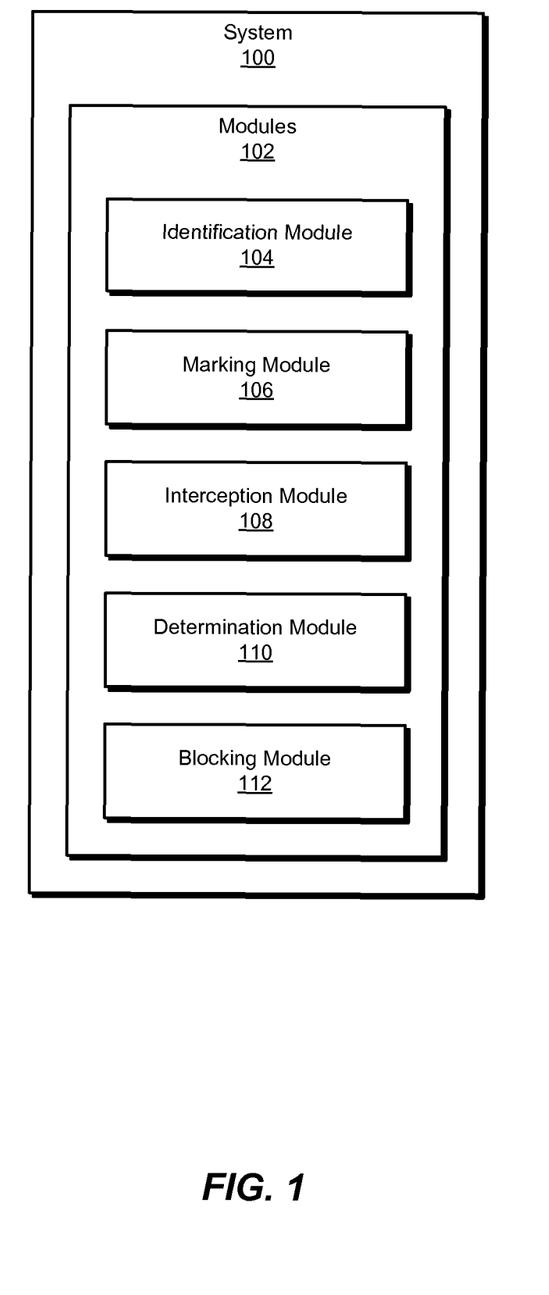
FIG. 1 is a block diagram of an exemplary system for customizing privacy control systems.

FIG. 1 is a block diagram of an exemplary system 100 for customizing privacy control systems. As illustrated in this figure, exemplary system 100 may include one or more modules 102 for performing one or more tasks. For example, and as will be explained in greater detail below, exemplary system 100 may include an identification module 104 that identifies at least one data entry, from within a set of data entries stored on a computing device, that has been selected to be inaccessible by an application installed on the computing device. Exemplary system 100 may also include a marking module 106 that marks the data entry with an indication that the data entry has been selected to be inaccessible by the application.

In addition, and as will be described in greater detail below, exemplary system 100 may include an interception module 108 that intercepts an attempt made by the application to access the data entry. Furthermore, exemplary system 100 may include a determination module 110 that determines that the application is not permitted to access the data entry by identifying the indication that the data entry was selected to be inaccessible by the application. Finally, exemplary system 100 may include a blocking module 112 that blocks the application from accessing the data entry in response to determining that the data entry has been marked as inaccessible while allowing at least one additional application to access the data entry. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
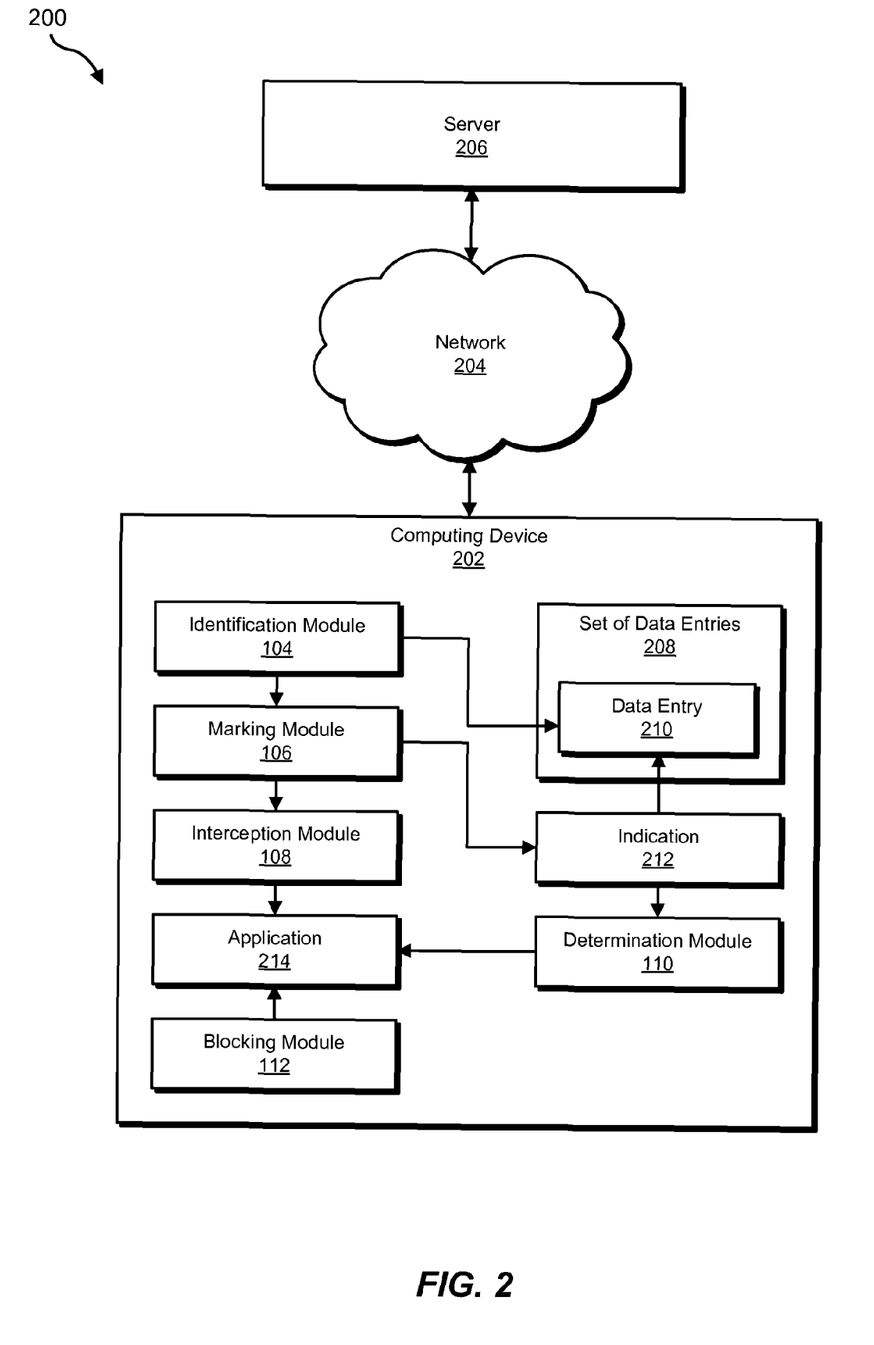
FIG. 2 is a block diagram of an additional exemplary system for customizing privacy control systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 in order to block applications installed on computing device 202 from accessing particular data entries. Additionally or alternatively, server 206 may be programmed with one or more of modules 102 in order to facilitate blocking access to data entries on multiple computing devices.

In one embodiment, one or more of modules 102 from FIG. 1 may, when executed by at least one processor of computing device 202 and/or server 206, enable computing device 202 and/or server 206 to customize privacy control systems. For example, and as will be described in greater detail below, identification module 104 may cause computing device 202 and/or server 206 to identify at least one data entry (e.g., data entry 210), from within a set of data entries (e.g., set of data entries 208) stored on a computing device (e.g., computing device 202), that has been selected to be inaccessible by an application (e.g., application 214) installed on the computing device. Next, marking module 106 may cause computing device 202 and/or server 206 to mark data entry 210 with an indication (e.g., indication 212) that data entry 210 has been selected to be inaccessible by application 214. In addition, interception module 108 may cause computing device 202 and/or server 206 to intercept an attempt made by application 214 to access data entry 210.

Furthermore, determination module 110 may cause computing device 202 and/or server 206 to determine that application 214 is not permitted to access data entry 210 by identifying the indication that data entry 210 was selected to be inaccessible by application 214. Finally, blocking module 112 may cause computing device 202 and/or server 206 to block application 214 from accessing data entry 210 in response to determining that data entry 210 has been marked as inaccessible while allowing at least one additional application to access data entry 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, computing device 202 may host application 214 and/or set of data entries 208.

Server 206 generally represents any type or form of computing device that is capable of identifying and marking selected data entries and blocking one or more applications from accessing the data entries. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
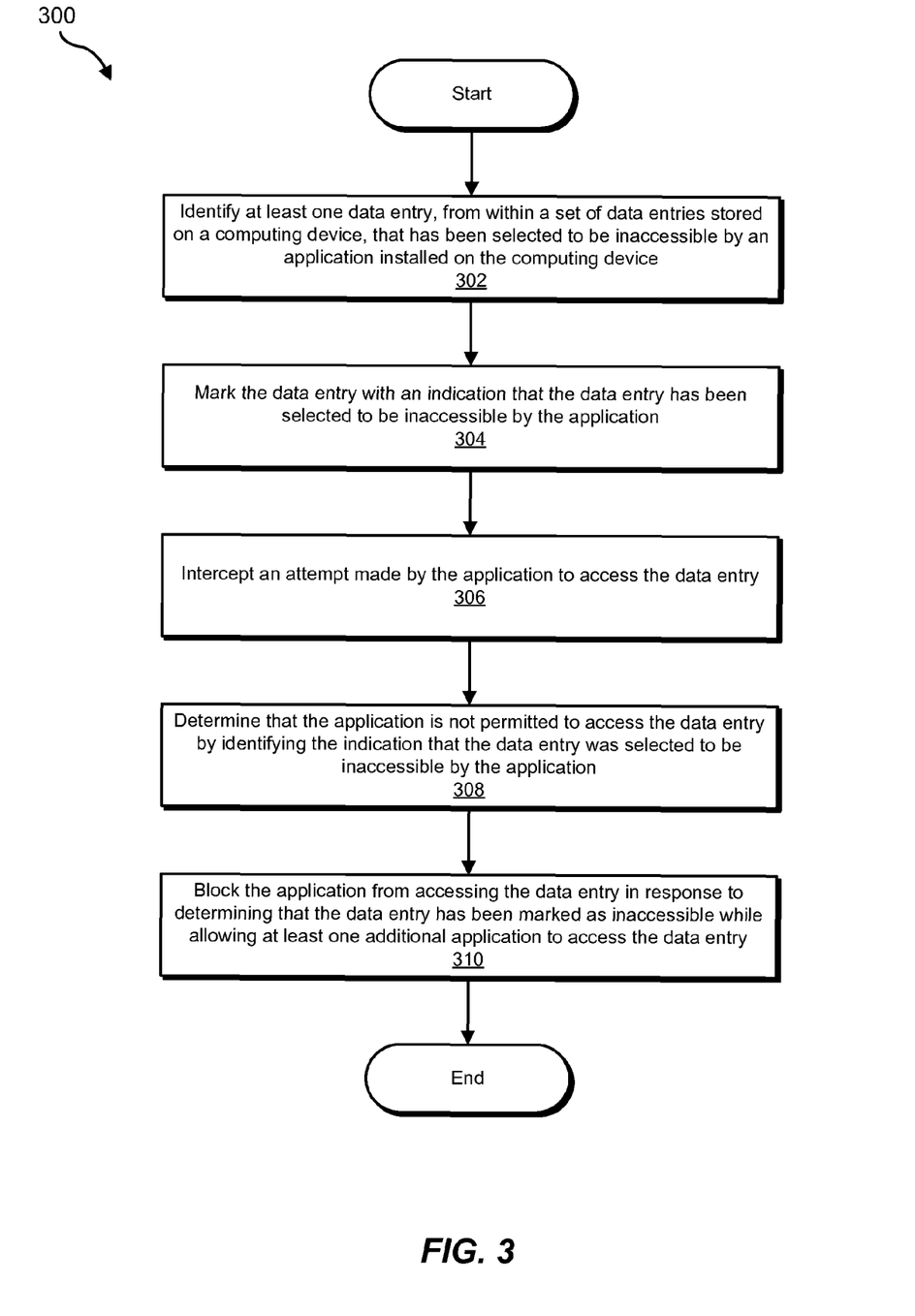
FIG. 3 is a flow diagram of an exemplary method for customizing privacy control systems.

FIG. 3 is a flow diagram of an exemplary computer-implemented method 300 for customizing privacy control systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify at least one data entry, from within a set of data entries stored on a computing device, that has been selected to be inaccessible by an application installed on the computing device. For example, identification module 104 may, as part of computing device 202 in FIG. 2, identify data entry 210, within set of data entries 208 stored on computing device 202, that has been selected to be inaccessible by application 214.

The term "data entry," as used herein, generally refers to any type or form of input, information, or file that a user may enter into an input field, upload or download to a computing device, and/or store within an application. Examples of data entries include, without limitation, contact information (e.g., phone numbers, email addresses, social media profiles, etc. associated with an individual), images, calendar events (e.g., meetings, appointments, etc.), emails, text messages, settings within an application, data files, database entries, combinations of one or more of the same, and/or any additional form of data entry. In some examples, data entries may represent discrete items within a larger set of data entries, such as a single photograph within an album stored on a social media profile or the contact information of a single individual within a phonebook application.

In addition, the term "application," as used herein, generally refers to any type or form of software, file, or executable code that may be installed, run, deployed, or otherwise implemented on a computing system. Examples of applications include, without limitation, messaging applications, phone applications, scheduling applications, calendar applications, web browsers, office software suites (e.g., word processing applications, spreadsheet applications, presentation applications, etc.), gaming applications, security applications, and/or media applications. In some examples, an application may represent any portion of software that requests permission to access one or more data entries stored on a computing device.

The systems described herein may identify the data entry that has been selected to be inaccessible by the application in a variety of ways. In some examples, identification module 104 may determine that a user of the computing device storing data entry 210 has marked data entry 210 to be inaccessible by application 214. For example, identification module 104 may allow the user to select data entry 210 (e.g., by checking a box next to data entry 210, highlighting data entry 210, clicking on data entry 210, etc.) to be inaccessible. In addition, identification module 104 may allow the user to select which application (or applications) data entry 210 will be inaccessible to. For example, the user may determine that some data entries are not appropriate to be accessed by a specific application, but they are appropriate to be accessed by other applications installed on a computing device. As such, identification module 104 may allow a user to select application 214 when selecting data entry 210 and/or identification module 104 may prompt the user to select data entry 210 when application 214 is installed on the computing device.

Figure 4:
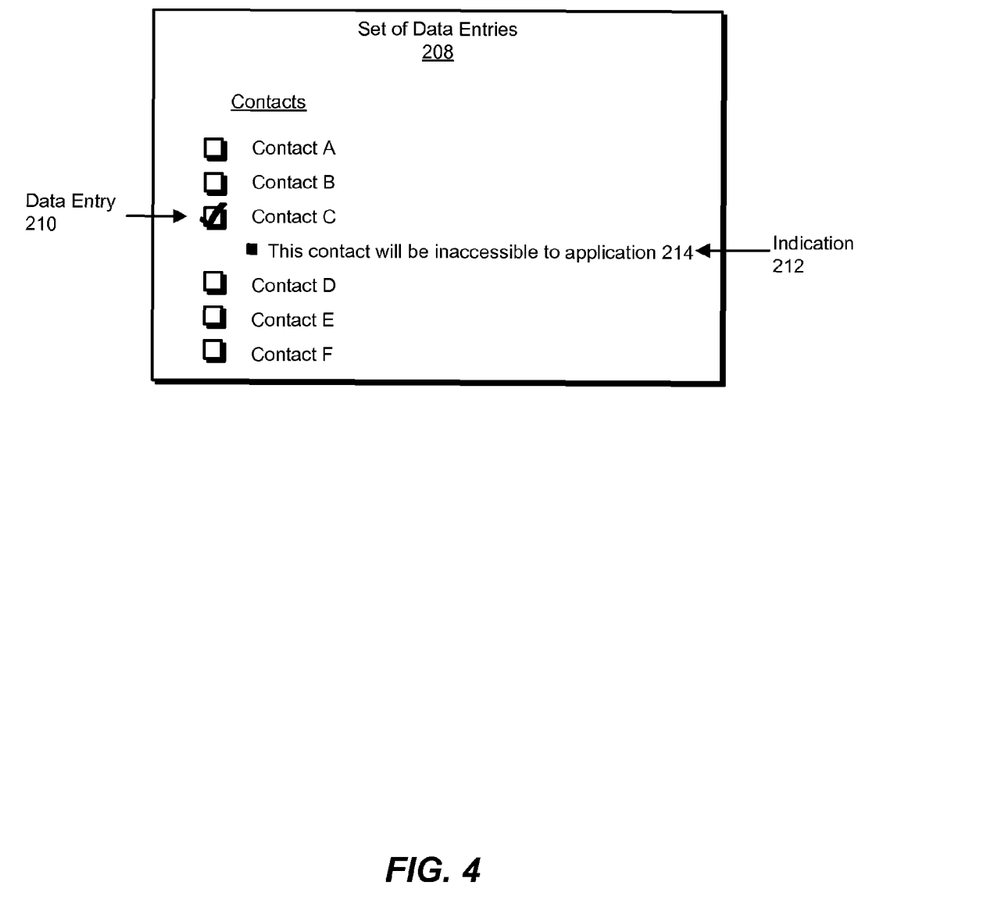
FIG. 4 is an illustration of an exemplary set of data entries.

As an example, FIG. 4 illustrates set of data entries 208. As shown in FIG. 4, set of data entries 208 may include contacts A-F. In this example, identification module 104 may allow the user that entered contacts A-F to select (e.g., by checking the box next to the appropriate contact) one or more contacts to be inaccessible by application 214. As shown in FIG. 4, the user may have selected contact C to be inaccessible. As a result of the user checking the box next to contact C, identification module 104 may notify the user that contact C will be inaccessible to application 214.

In some examples, identification module 104 may not require that a user select data entries to be inaccessible by application 214. Instead, identification module 104 may automatically identify data entry 210 by determining that a category, label, and/or type of data entry 210 is known to be indicative of private data, confidential data, etc. For example, identification module 104 may determine whether data entry 210 is associated with a friend, family member, or colleague of the user, whether data entry 210 is an image or text-based, etc. Identification module 104 may determine the category of data entry 210 by analyzing the origin and/or the content of data entry 210. Furthermore, identification module 104 may determine that application 214 should not have access to data within that category. For example, identification module 104 may determine that application 214 interacts with and shares data with additional users and/or applications and therefore that application 214 should not have access to private data.

As an example, set of data entries 208 may represent an email contact list and application 214 may represent a company-wide email application. Identification module 104 may identify the domain of each of the email addresses within set of data entries 208 and then determine that email addresses within a certain domain (e.g., work-related domains) should be made accessible to application 214, while email addresses within other domains (e.g., domains associated with personal email addresses) should not be made accessible to application 214. As an additional example, if set of data entries 208 represents digital photographs stored on computing device 202 and application 214 represents a professional social networking application, identification module 104 may determine that photographs of the user should be made accessible to application 214, while photographs of family and friends of the user should not be made accessible to application 214.

Additionally or alternatively, identification module 104 may identify data entry 210 on a predetermined list of data entries selected to be inaccessible. In some embodiments, the list may have originated from outside the computing device. For example, an administrator or user of the computing device may compile a list of individual data entries or categories of data entries that contain information that should be not accessed by application 214. Identification module 104 may then search the computing device for any data entries identified on the list. In some examples, the list of inaccessible data entries may be applied to multiple computing devices for one or more applications.

In some examples, identification module 104 may identify data entry 210 by identifying or inferring any indication that data entry 210 was selected to be inaccessible to application 214. However, in other examples, identification module 104 may identify data entry 210 by determining that data entry 210 was not selected to be accessible by application 214. For example, a user, administrator, or category of data may indicate all of the data entries within set of data entries 208 that are indicated as appropriate for application 214 to access. Identification module 104 may then determine that all entries not indicated as accessible should be made inaccessible.

Returning to FIG. 3, at step 304 one or more of the systems described herein may mark the data entry with an indication that the data entry has been selected to be inaccessible by the application. For example, marking module 106 may, as part of computing device 202 in FIG. 2, mark data entry 210 with indication 212. The term "indication," as used herein, generally refers to any type or form of digital marking, signal, or association that designates a data entry to be inaccessible by a particular application.

The systems described herein may mark the data entry with the indication in a variety of ways. In some embodiments, a user may select data entry 210 to be inaccessible by application 214 by marking data entry 210 with indication 212. In the example shown in FIG. 4, when the user selects contact C to be inaccessible by checking the box next to contact C, marking module 106 may automatically add indication 212 to contact C. In these examples, indication 212 may represent any metadata of and/or association with data entry 210 that will be identified and analyzed when application 214 attempts to access data entry 210.

Figure 5:
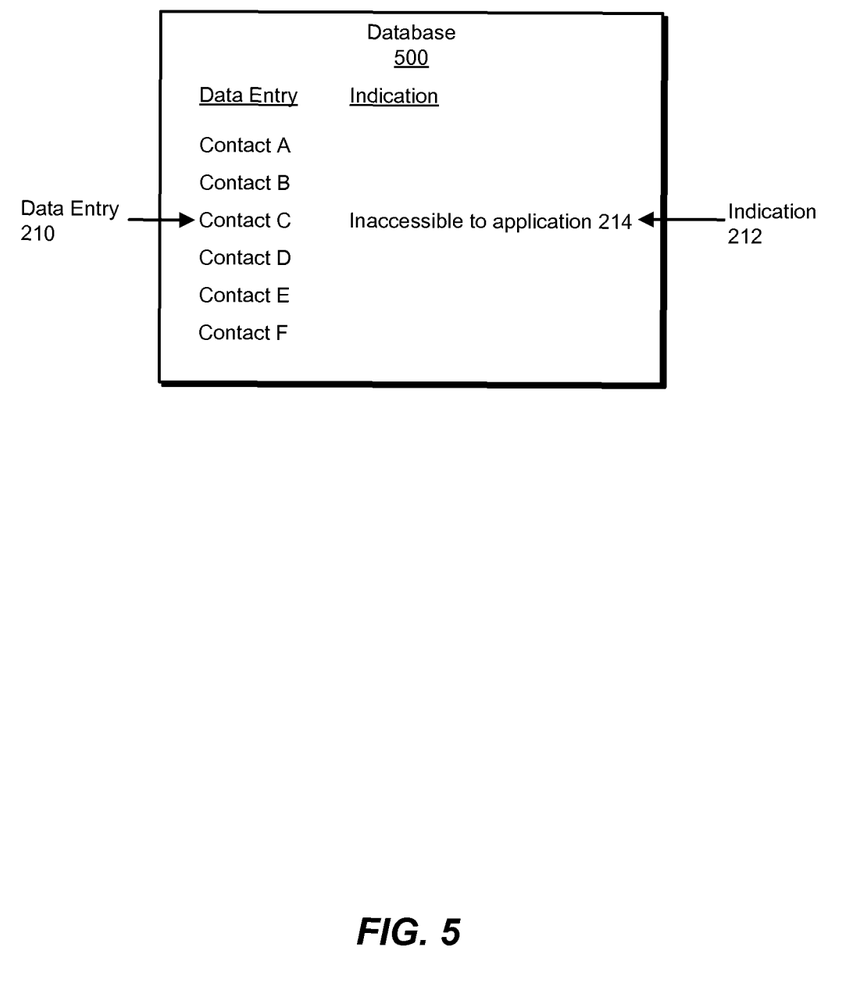
FIG. 5 is an illustration of an exemplary database.

Additionally or alternatively, marking module 106 may mark data entry 210 with indication 212 by associating data entry 210 with indication 212 in a database. For example, after identification module 104 identifies data entry 210, marking module 106 may store an association between data entry 210 and indication 212 in a database that may be accessed when application 214 attempts to access data entry 210. As an example, FIG. 5 illustrates database 500. As shown in FIG. 5, contact C was identified as a data entry (e.g., data entry 210) that is inaccessible to an application. As a result, marking module 106 may store indication 212 in database 500 that designates contact C as inaccessible to application 214. In some examples, database 500 may store associations that designate multiple data entries as inaccessible to an application and/or that designate one or more data entries as inaccessible to multiple applications.

Indication 212 may be represented in a variety of manners. In some examples, indication 212 may be represented simply by toggling a bit in a database (e.g., flipping a logical "0" to a "1"). However, in some examples, indication 212 may be represented in a more complex manner in order to increase the security and privacy of information associated with a user. For example, indication 212 may be represented by a digital signature created with a private key associated with the user of the computing device that stores data entry 210.

The term "private key," as used herein, generally refers to one half of a pair of inverse cryptographic algorithms used to securely encrypt and decrypt data and/or create digital signatures. A private key may represent the confidential half of the cryptographic pair and may therefore only be known to authorized entities. In contrast, a public key, representing the other half of the key pair, may be readily accessed by any entity. Data encrypted using the one half of the key pair may be decrypted using the other half of the key pair. As such, data encrypted with the private key may be guaranteed to originate from authorized entities and data encrypted with the public key may only be decrypted by authorized entities.

In order to associate data entry 210 with a digital signature, marking module 106 may first access a server (e.g., server 206 in FIG. 2) that stores the private key associated with the user. For example, marking module 106 may identify the server and/or the user may grant permission to marking module 106 to access the private key in the server. In addition, marking module 106 may create a hash or digest of data entry 210. For example, marking module 106 may perform any of a variety of hashing functions on data entry 210, such as a SHA algorithm, a checksum algorithm, a MD algorithm, or any suitable hashing algorithm. Marking module 106 may then send the hash of the data entry to the server that stores the private key (in some examples, marking module 106 may send data entry 210 directly to the server without creating a hash of data entry 210, although creating a hash may increase the efficiency of the digital signing process as a hash is generally smaller than the original data).

Once the server receives the hash, marking module 106 may direct the server to sign the hash using the private key. Specifically, marking module 106 may direct the server to encrypt the hash with the private key and append the encrypted hash to the message containing the hash. The encrypted hash may represent the digital signature of the user. Next, marking module 106 may direct the server to send the message with the digital signature to marking module 106. Finally, once marking module 106 receives the digital signature, marking module 106 may associate the private key with data entry 210. For example, marking module 106 may store the digital signature of the user in a database and/or store the digital signature alongside data entry 210.

Returning to FIG. 3, at step 306 one or more of the systems described herein may intercept an attempt made by the application to access the data entry. For example, interception module 108 may, as part of computing device 202 in FIG. 2, intercept the attempt made by application 214 to access data entry 210.

The systems described herein may intercept the attempt to access the data entry in a variety of ways. In some examples, interception module 108 may intercept the attempt when a user installs and/or runs application 214. For example, interception module 108 may determine that when application 214 is installed and/or executed, application 214 requests permission to access data entry 210. In addition, interception module 108 may intercept the attempt when application 214 attempts to access the entirety of set of data entries 208 (i.e., a set of data entries that includes data entry 210).

Specifically, in some examples, interception module 108 may intercept the attempt to access data entry 210 by hooking an application program interface (API) associated with data entry 210. The phrase "hooking," as used herein, generally refers to any type or form of technique or process used to intercept function calls, messages, or other events passed between software components. Hooks may be inserted into software during runtime and/or before the software runs. In some examples, hooking may be accomplished by modifying an executable file or a library associated with the event to be intercepted.

In addition, the term "application program interface," as used herein, generally refers to any type or form of software or executable code that specifies how two or more software components interact with one another. For example, an API may include a set of functions, libraries, data structures, object classes, and/or variables that connect different applications, portions of applications, graphical user interfaces, etc. In some examples, an API may facilitate an application's access to one or more data entries.

As such, before application 214 attempts to access data entry 210, interception module 108 may identify the API that controls how application 214 accesses data entry 210. Interception module 108 may then insert a hook into the API that will intercept a function call made by application 214 to access data entry 210. In this way, interception module 108 may determine precisely when application 214 attempts to access data entry 210 in order to block application 214 from accessing data entry 210.

Returning to FIG. 3, at step 308 one or more of the systems described herein may determine that the application is not permitted to access the data entry by identifying the indication that the data entry was selected to be inaccessible by the application. For example, determination module 110 may, as part of computing device 202 in FIG. 2, determine that application 214 is not permitted to access data entry 210 by identifying indication 212.

The systems described herein may identify the indication that the data entry was selected to be inaccessible in a variety of ways. In some examples, determination module 110 may identify indication 212 in response to interception module 108 intercepting the attempt made by application 214 to access data entry 210. For example, intercepting the attempt to access data entry 210 may prompt determination module 110 to search for indication 212. In some embodiments, if the user entered indication 212 into the user input field associated with data entry 210, determination module 110 may analyze each data entry (e.g., set of data entries 208) requested by application 214 in order to identify indication 212. Referring to the example of FIG. 4, determination module 110 may loop through each of contacts A-F. Determination module 110 may then determine that contact C was marked with indication 212. Additionally or alternatively, if marking module 106 associated data entry 210 with indication 212 in a database, determination module 110 may search the database in order to identify indication 212. Referring to the example of FIG. 5, determination module 110 may determine that contact C is associated with indication 212 in database 500.

In some examples, if marking module 106 associated data entry 210 with the user's private key, determination module 110 may identify indication 212 by verifying the private key with a public key associated with the user. For example, marking module 106 may have stored a hash of data entry 210 encrypted with the user's private key as indication 212. In this example, determination module 110 may retrieve and/or access the user's public key and attempt to decrypt the encrypted hash using the public key. If the decrypted hash matches the original unencrypted hash of data entry 210, determination module 110 may determine that data entry 210 was marked with indication 212 by an authorized entity and therefore that application 214 should be blocked from accessing data entry 210.

Returning to FIG. 3, at step 310 one or more of the systems described herein may block the application from accessing the data entry in response to determining that the data entry has been marked as inaccessible while allowing at least one additional application to access the data entry. For example, blocking module 112 may, as part of computing device 202 in FIG. 2, block application 214 from accessing data entry 210 in response to determining that data entry 210 has been marked as inaccessible.

The systems described herein may block the application from accessing the data entry in a variety of ways. For example, blocking module 112 may deny and/or revoke permission for application 214 to access data entry 210. In addition, blocking module 112 may hide data entry 210 from application 214 and/or quarantine data entry 210. In general, blocking module 112 may perform any suitable action to prevent application 214 from reading, analyzing, and/or utilizing data entry 210 in any manner.

Notably, blocking module 112 may only prevent application 214 (or any additional selected applications) from accessing data entry 210, while not blocking other applications from accessing data entry 210. In some examples, blocking module 112 may determine that one or more additional applications request permission to access data entry 210. In these examples, blocking module 112 may allow the additional application to access data entry 210. In other words, blocking module 112 may not interfere with the normal interaction between the additional application and data entry 210. In this way, the systems described herein may ensure that a user and/or administrator retains granular control over the privacy settings for individual data entries and applications.

In some examples, determination module 110 may determine that at least one additional data entry within set of data entries 208 was not selected to be inaccessible by application 214. As such, blocking module 112 may allow application 214 to access the additional entry. Referring to the examples of FIGS. 4 and 5, determination module 110 may determine that only contact C, within contacts A-F, was selected to be inaccessible to application 214. Therefore, when interception module 108 intercepts an attempt by application 214 to access all of contacts A-F, blocking module 112 may allow application 214 to access every contact except contact C (i.e., contacts A-B and D-F).

The systems and methods disclosed herein may be implemented in a variety of ways and provide a number of advantages. For example, by identifying and/or allowing a user to select individual data entries to be inaccessible by a particular application, the described systems and methods may prevent the application from accessing the data entries. In addition, by blocking access to data entries determined to be inappropriate for certain applications, the systems and methods disclosed herein may enable users to increase and customize the security and privacy of their personal computing devices. Specifically, the described systems and methods may allow individuals to utilize their personal computing devices for both business and private applications without risking exposure of either personal or business data.

Figure 6:
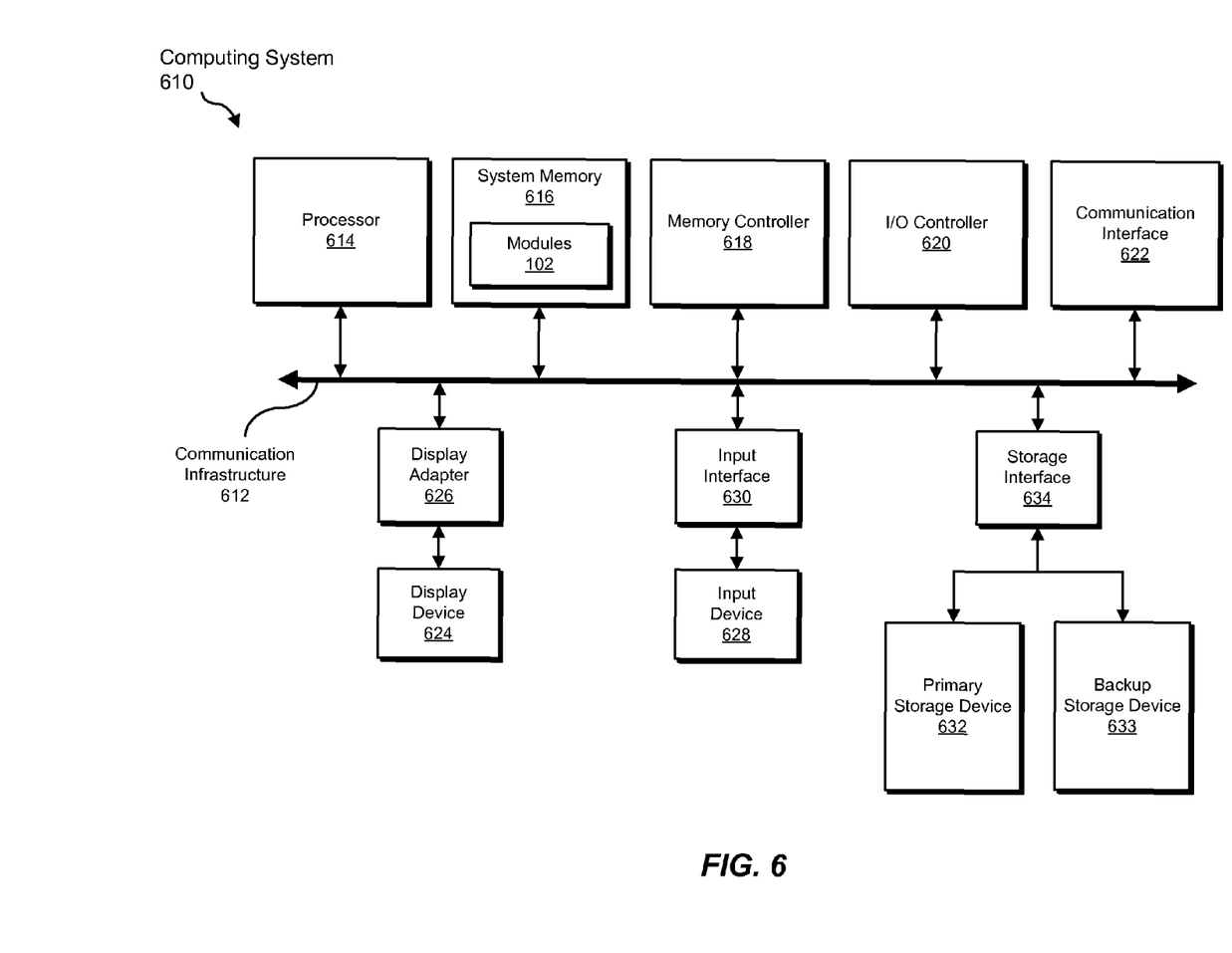
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
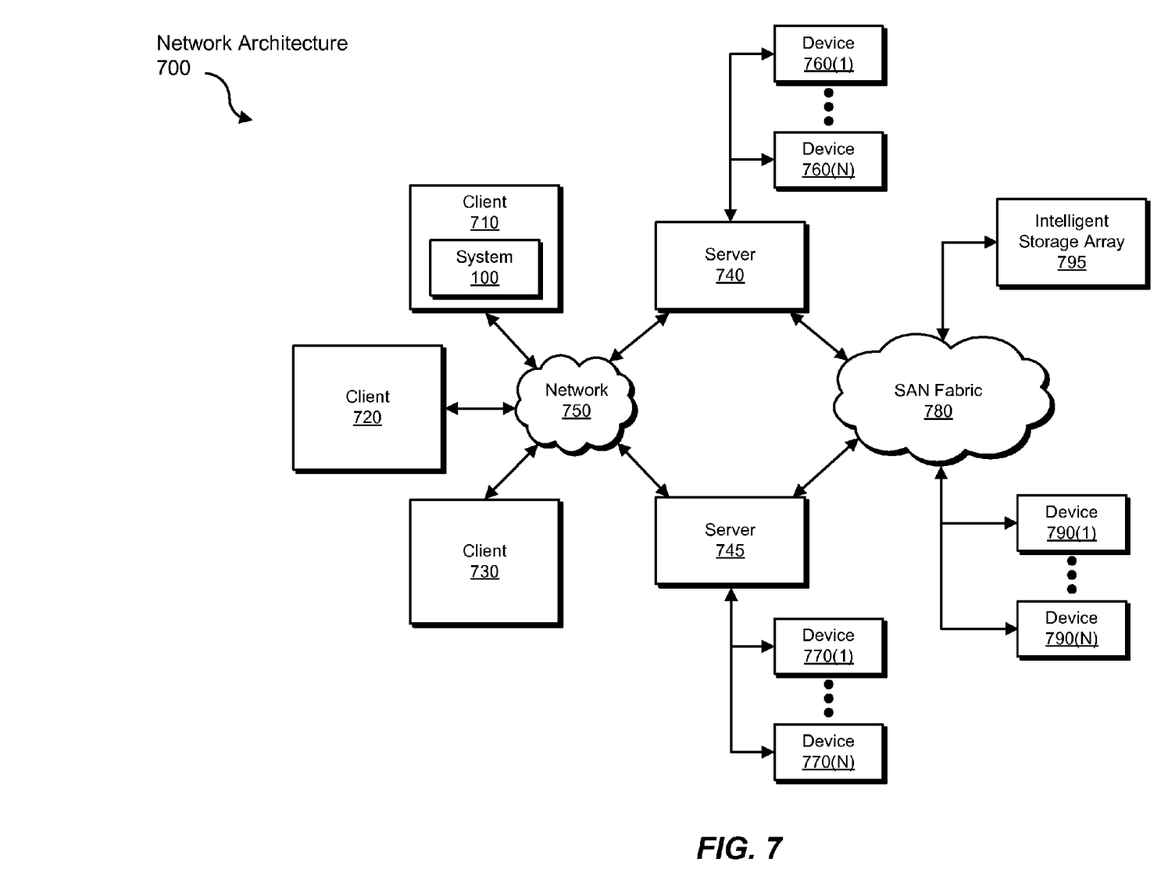
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for customizing privacy control systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data entry to be transformed, transform the data entry, store the result of the transformation to indicate that the data entry should be made inaccessible to an application, and use the result of the transformation to block the application from accessing the data entry. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for customizing privacy control systems, at least a portion of the method being performed by a computing device comprising at least one processor, the method comprising:
    identifying at least one data entry, from within a set of data entries stored on the computing device, that has been selected to be inaccessible to a particular application installed on the computing device but accessible to at least one additional application installed on the computing device based on a determination that:
        the data entry contains sensitive information;
        the application should not have access to the sensitive information; and
        the additional application is permitted to have access to the sensitive information;
    marking the data entry with an indication that the data entry has been selected to be inaccessible by the application by:
        creating a hash of the data entry;
        sending the hash to a server that stores a private key associated with a user of the computing device;
        receiving, from the server, the hash signed with the private key associated with the user; and
        associating the data entry with the signed hash;
    intercepting an attempt made by the application to access the data entry;
    determining that the application is not permitted to access the data entry by:
        identifying the signed hash associated with the data entry; and
        verifying the signed hash using a public key associated with the user; and
    providing granular control over privacy of the data entry by:
        blocking the application from accessing the data entry in response to determining that the data entry has been marked as inaccessible to the application; and
        allowing the additional application to access the data entry.

2. The method of claim 1, wherein identifying the data entry further comprises at least one of:
    determining that a user of the computing device selected the data entry to be inaccessible by the application;
    determining that a category of the data entry is a category known to include private data; and
    identifying the data entry on a list, originating from outside the computing device, of data entries selected to be inaccessible.

3. The method of claim 1, wherein:
    the data entry contains information that is personal to a user of the computing device; and the application comprises a work-related application that should not have access to information that is personal to the user.

4. The method of claim 1, wherein marking the data entry with the indication further comprises at least one of:
   a user entering the indication into a user input field associated with the data entry; and
   associating the data entry with the indication in a database.

5. The method of claim 1, wherein intercepting the attempt by the application to access the data entry comprises:
   before the application attempts to access the data entry, hooking an application program interface associated with the data entry; and
   intercepting, with the application program interface hook, a function call made by the application to access the data entry.

6. The method of claim 1, further comprising:
   determining that at least one additional data entry within the set of data entries was not selected to be inaccessible by the application; and
   allowing the application to access the additional data entry.

7. The method of claim 1, wherein the data entry comprises at least one of:
   contact information;
   an image;
   a calendar event;
   an email; and
   a text message.

8. The method of claim 1, wherein:
   the data entry contains work-related information; and
   the application comprises a personal application that should not have access to work-related information.

9. The method of claim 1, wherein blocking the application from accessing the data entry comprises at least one of:
   hiding the data entry from the application; and
   preventing the application from reading the data entry.

10. A system for customizing privacy control systems, the system comprising:
    an identification module, stored in memory, that identifies at least one data entry, from within a set of data entries stored on a computing device, that has been selected to be inaccessible to a particular application installed on the computing device but accessible to at least one additional application installed on the computing device based on a determination that:
       the data entry contains sensitive information;
       the application should not have access to the sensitive information; and
       the additional application is permitted to have access to the sensitive information;
    a marking module, stored in memory, that marks the data entry with an indication that the data entry has been selected to be inaccessible by the application by:
       creating a hash of the data entry;
       sending the hash to a server that stores a private key associated with a user of the computing device;
       receiving, from the server, the hash signed with the private key associated with the user; and
       associating the data entry with the signed hash;
    an interception module, stored in memory, that intercepts an attempt made by the application to access the data entry;
    a determination module, stored in memory, that determines that the application is not permitted to access the data entry by:
       identifying the signed hash associated with the data entry; and
       verifying the signed hash using a public key associated with the user;
    a blocking module, stored in memory, that provides granular control over privacy of the data entry by:
       blocking the application from accessing the data entry in response to determining that the data entry has been marked as inaccessible to the application; and
       allowing the additional application to access the data entry; and
    at least one processor configured to execute the identification module, the marking module, the interception module, the determination module, and the blocking module.

11. The system of claim 10, wherein the identification module further identifies the data entry by at least one of:
    determining that a user of the computing device selected the data entry to be inaccessible by the application;
    determining that a category of the data entry is a category known to include private data; and
    identifying the data entry on a list, originating from outside the computing device, of data entries selected to be inaccessible.

12. The system of claim 10, wherein:
    the data entry contains information that is personal to a user of the computing device; and
    the application comprises a work-related application that should not have access to information that is personal to the user.

13. The system of claim 10, wherein the marking module further marks the data entry with the indication by at least one of:
    determining that a user entered the indication into a user input field associated with the data entry; and
    associating the data entry with the indication in a database.

14. The system of claim 10, wherein the interception module intercepts the attempt by the application to access the data entry by:
    before the application attempts to access the data entry, hooking an application program interface associated with the data entry; and
    intercepting, with the application program interface hook, a function call made by the application to access the data entry.

15. The system of claim 10, wherein:
    the determination module determines that at least one additional data entry within the set of data entries was not selected to be inaccessible by the application; and
    the blocking module allows the application to access the additional data entry.

16. The system of claim 10, wherein the data entry comprises at least one of:
    contact information;
    an image;
    a calendar event;
    an email; and
    a text message.

17. The system of claim 10, wherein:
    the data entry contains work-related information; and
    the application comprises a personal application that should not have access to work-related information.

18. The system of claim 10, wherein the blocking module blocks the application from accessing the data entry by at least one of:
- hiding the data entry from the application; and
- preventing the application from reading the data entry.

19. A non-transitory computer-readable medium comprising one or more computer-executable instructions that, when executed by at least one processor of a computing device, cause the computing device to:
- identify at least one data entry, from within a set of data entries stored on the computing device, that has been selected to be inaccessible to a particular application installed on the computing device but accessible to at least one additional application installed on the computing device based on a determination that:
  - the data entry contains sensitive information;
  - the application should not have access to the sensitive information; and
  - the additional application is permitted to have access to the sensitive information;
- mark the data entry with an indication that the data entry has been selected to be inaccessible by the application by:
  - creating a hash of the data entry;
  - sending the hash to a server that stores a private key associated with a user of the computing device;
  - receiving, from the server, the hash signed with the private key associated with the user; and
  - associating the data entry with the signed hash;
- intercept an attempt made by the application to access the data entry;
- determine that the application is not permitted to access the data entry by:
  - identifying the signed hash associated with the data entry; and
  - verifying the signed hash using a public key associated with the user; and
- provide granular control over privacy of the data entry by:
  - blocking the application from accessing the data entry in response to determining that the data entry has been marked as inaccessible to the application; and
  - allowing the additional application to access the data entry.

20. The computer-readable medium of claim 19, wherein:
- the data entry contains work-related information; and
- the application comprises a personal application that should not have access to work-related information.

* * * * *